June 8, 1954 G. A. DONATH 2,680,547
BATTERY GRID PLATE PASTING MACHINE
Filed April 5, 1948 6 Sheets-Sheet 1

GEORGE A. DONATH,
INVENTOR.

BY
ATTORNEY.

June 8, 1954 G. A. DONATH 2,680,547
BATTERY GRID PLATE PASTING MACHINE
Filed April 5, 1948 6 Sheets-Sheet 3

GEORGE A. DONATH,
INVENTOR.

BY
ATTORNEY.

GEORGE A. DONATH,
INVENTOR.

BY *Stuart M. Maule*

ATTORNEY.

June 8, 1954 — G. A. DONATH — 2,680,547
BATTERY GRID PLATE PASTING MACHINE
Filed April 5, 1948 — 6 Sheets-Sheet 5
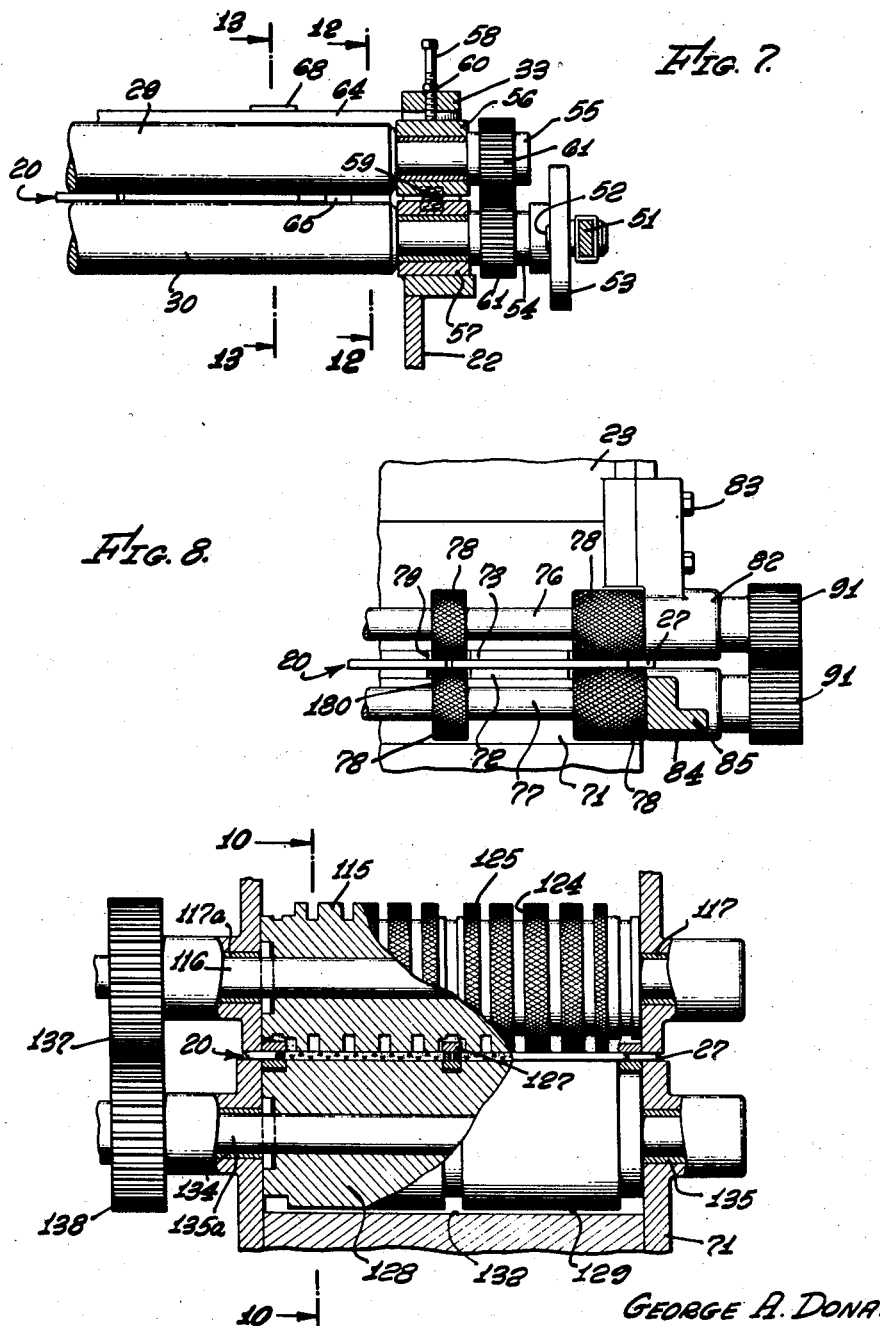

GEORGE A. DONATH,
INVENTOR.

Patented June 8, 1954

2,680,547

UNITED STATES PATENT OFFICE 2,680,547

BATTERY GRID PLATE PASTING MACHINE

George A. Donath, Los Angeles, Calif.

Application April 5, 1948, Serial No. 19,017

4 Claims. (Cl. 226—39.6)

This invention relates to machines for making storage battery plates, and more particularly to machines for placing electro-chemically active material in paste form on the lead grids which constitute the frames of the plates.

In my Patent No. 2,382,367, issued August 14, 1945, I have disclosed a machine of the above-described character, and my present invention embodies certain improvements over the machine disclosed in said patent, and has as an object the provision of a grid pasting machine of simplified construction and greater efficiency in operation and maintenance.

Another object of the invention is to provide a grid pasting machine that may easily be dismantled and reassembled for purposes of inspection, cleaning, replacement of parts, and repair.

Yet another object of the invention is to provide a grid pasting machine which will preform a grid to precise dimensions, apply the paste evenly to the grid, and discharge the pasted grid through a passage precisely adjustable to permit transit of a grid of said dimensions with no excess paste adhering thereto.

A further object of the invention is to provide a grid pasting machine having simplified paste-applying mechanism capable of applying paste to a precision-formed grid with substantially uniform pressure across the face of the grid so as to obtain uniform packing of the grid interstices.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred forms within the scope of my invention as set forth in the claims.

Referring to the drawings:

Figure 6 is a fragmentary, compound sectional view on a further enlarged scale from the right, or feeding, end of the machine, the plane of section being indicated by the line 6—6 of Figure 2.

Figure 7 is a vertical sectional view, also from the right, through preparatory press rollers at the feeding end of the machine, the plane of section being indicated by the line 7—7 of Figure 3.

Figure 8 is a vertical sectional view through conveying rollers subsequent in operation to the press rollers, the plane of section being indicated by the line 8—8 of Figure 3, with the direction of view as indicated.

Figure 9 is a vertical sectional view through pasting rollers subsequent in operation to the aforesaid conveying rollers, the plane of section being indicated by the line 9—9 of Figure 3, with the direction of view as indicated.

Figure 12 is a vertical sectional view through the aforesaid press rollers, taken at a right angle to the view of Figure 7 and on the line 12—12 thereof.

Figure 13 is another vertical sectional view through the press rollers, the plane of section being indicated by the line 13—13 of Figure 7, with the direction of view as indicated.

Figure 14 is a vertical sectional view through hinge mechanism of the paste hopper, taken on the line 14—14 of Figure 1, with the direction of view as indicated.

Figure 1:
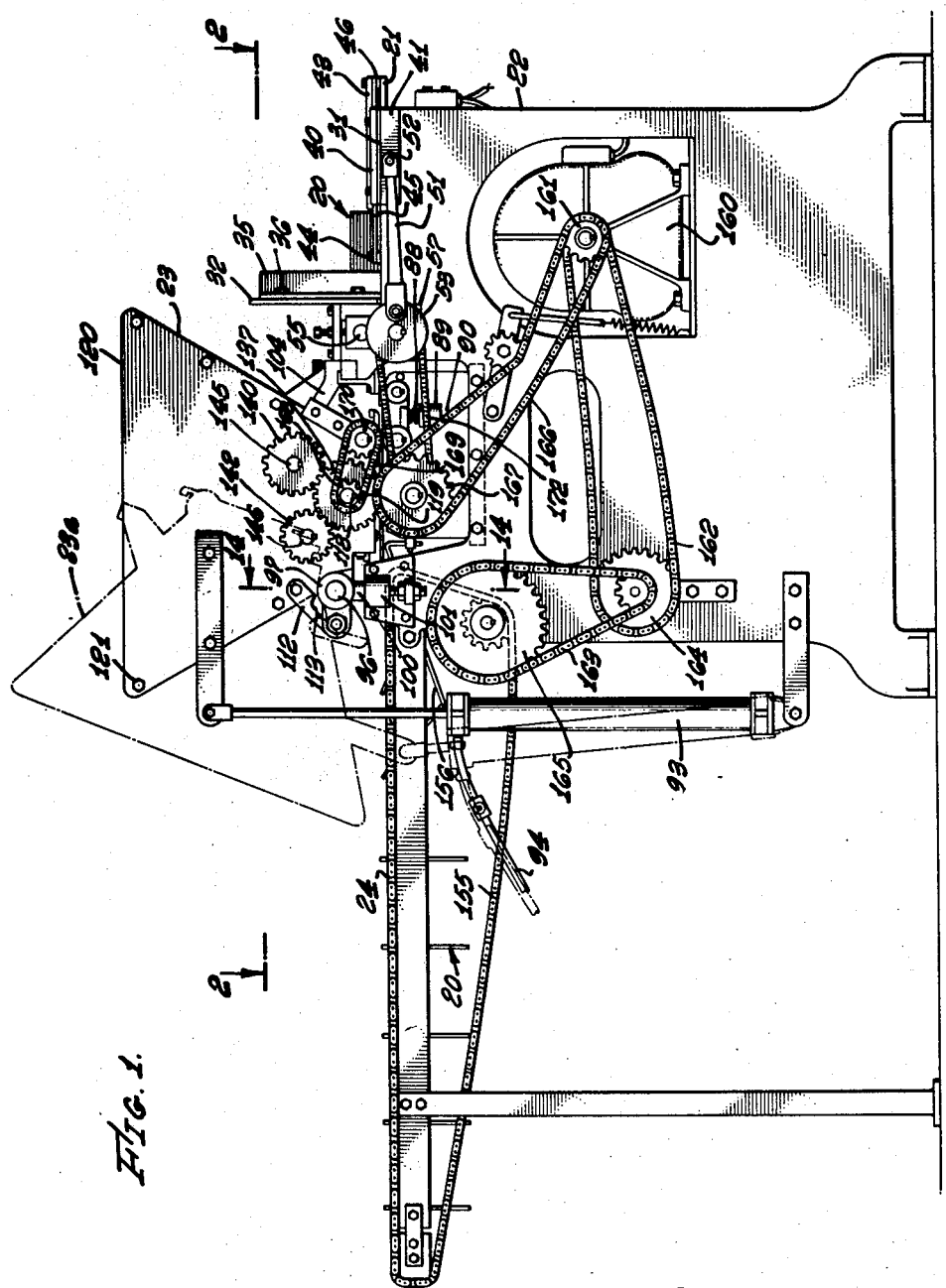
Figure 1 is a side elevational view of a grid pasting machine embodying the principles of the present invention.

Having reference to the details of the drawings, I have shown in Figure 1 a stack of grids 20 stacked on a table 21 on the rearward end of the machine frame 22 preparatory to being fed automatically one at a time through the machine. In the course of their passage through the machine, the grids are successively roller-ironed to remove irregularities of casting, conveyed beneath a hopper 23 containing paste which is to be applied to the grid, filled with paste by a mechanism at and below the outlet of the hopper, and discharged onto a conveyor 24 in a manner eliminating excess paste from the grid surfaces and preserving the smoothness of the surfaces as prepared by the preceding mechanism.

Figure 2:
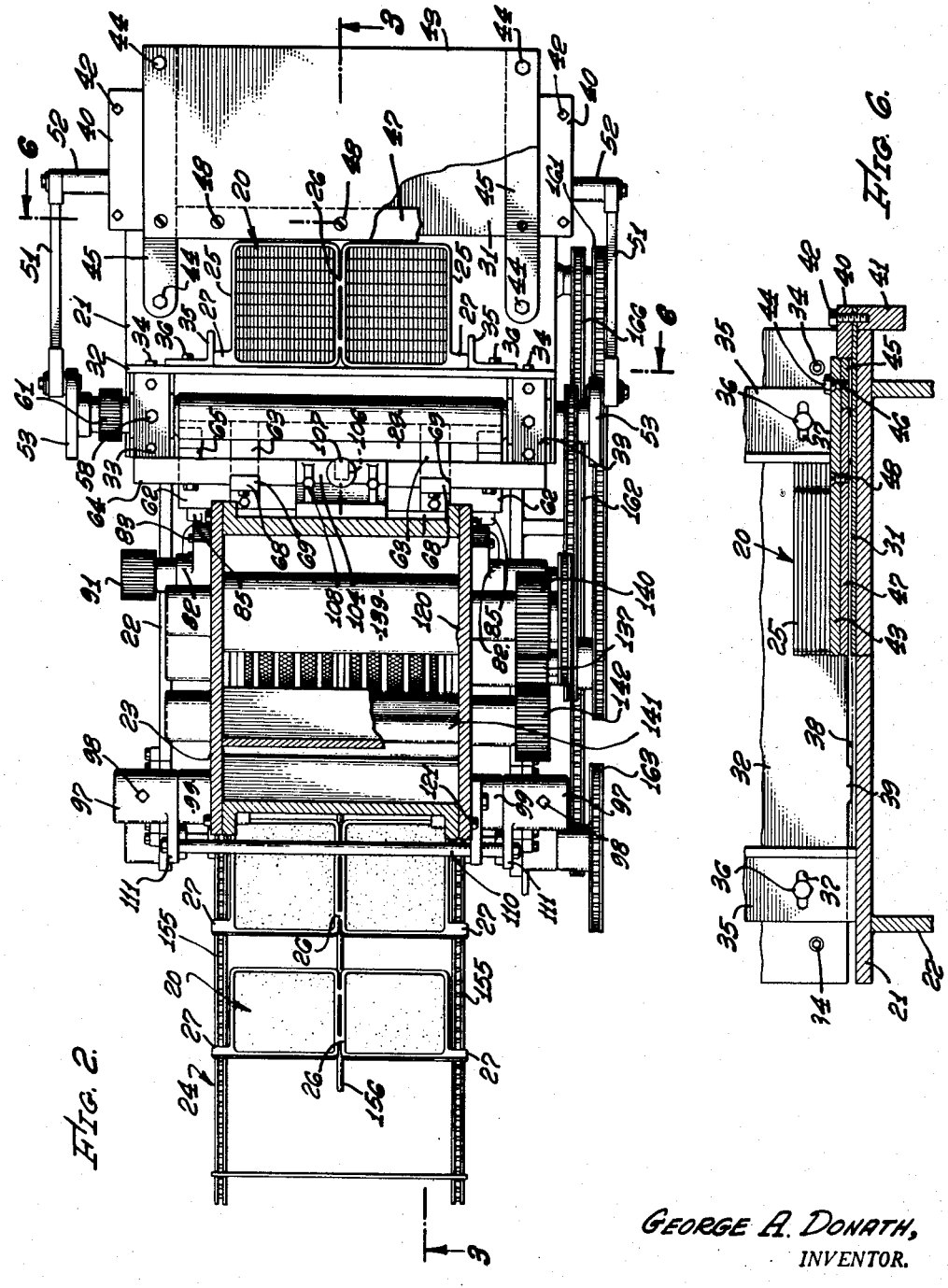
Figure 2 is a plan view, partly in section and on an enlarged scale, the plane of section being indicated by the line 2—2 of Figure 1, with the direction of view as indicated.

As shown in Figure 2, a grid 20 comprises a substantially oblong plate having reticulated end portions 25 divided by a central bar 26, and having a lug 27 extending from each end. Such grids are formed from lead by a casting process which may produce uneven thicknesses or leave small surface irregularities, resulting either in rejected grids, or difficulty in feeding grids through the pasting machine, or at least irregularly surfaced finished plates. Due to the softness of the lead and to the thin reticulated construction, there is also a tendency for the grids to warp and buckle if subjected to rough handling or locally applied stresses.

Figure 3:
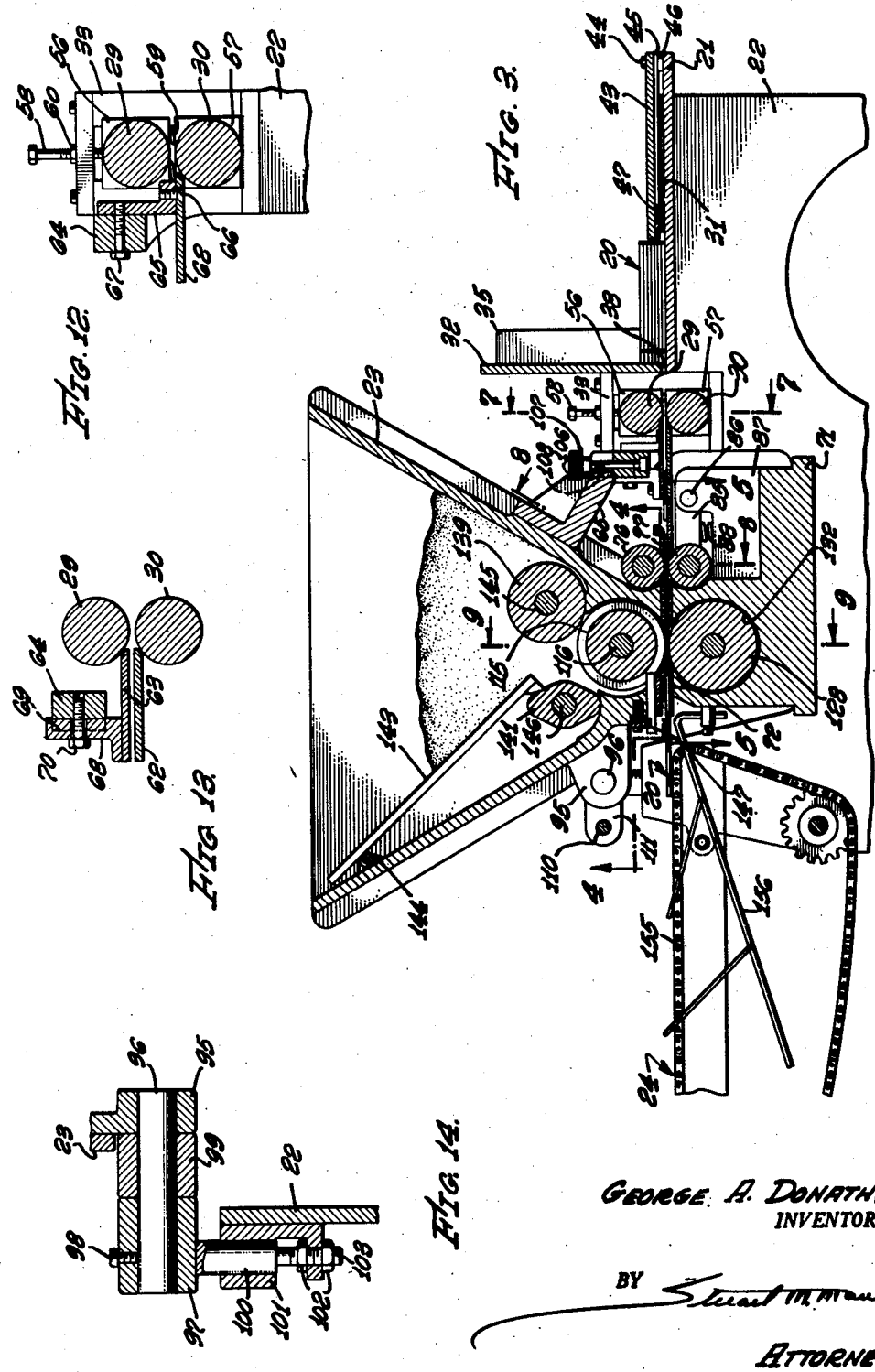
Figure 3 is a vertical sectional view taken on the line 3—3 of Figure 2, with the direction of view as indicated.

As a step preparatory to pasting, the grids 20 are individually fed through press rollers 29 and 30, to be more fully described later, by a pitman driven push-bar 31. The grids are stacked on the table 21 in a frame formed by an upright retaining plate 32 secured to the bearing housings 33 of the press rollers 29 and 30, by bolts 34, and side guides 35 secured adjustably to the retaining plate 32 by bolts 36 in slots 37 so as to accommodate grids of varying widths. The lower edge of the retaining plate 32 is raised above the table 21 to provide a slot 38 (see Figure 6) through which one grid may pass at a time, the major portion of the slot 38 being slightly more than adequate in height for such passage to allow for surface irregularities of the grid and the lower margin of the retaining plate 32 having a narrow rail 39 extending downwardly into the slot 38 to a depth just permitting one grid to pass while preventing simultaneous passage of a second grid. The push-bar 31 is held clamped at its ends between slide rails 40 and 41, which slide respectively on the upper surface and lateral margins of the table 21 and are clamped together by bolts 44 and are spaced vertically therefrom by longitudinal side bars 45 and washers 46 (Figures 1 and 3). A crossbar 47 is secured to the underside of the plate 43 between the side bars 45 by screws 48 and acts as the upper guide for the push-bar 31. The plate 43 and crossbar 47 also form the rearward margin of the frame or well in which the grids 20 are stacked and prevent the grids from being pulled rearwardly by friction of the rearward motion of the push-bar 31. It will be seen that the push-bar 31 has freedom of forward and rearward motion between the bolts 44, and that the clearance of the crossbar 47 above the table 21 may be readily altered to accommodate push-bars of thicknesses suitable for use with different thicknesses of grids, by clamping the washers 46.

The push-bar 31 is driven by pitmans 51 connected to wrist pins 52 outstanding laterally from the slide rails 41 and to crank wheels 53 mounted on the ends of the shaft 54 of the lower press roller 30. The press rollers 29 and 30, as shown in detail in Figures 7 and 12, have their shafts 55 and 54 journalled respectively in bearings 56 and 57 contained in the bearing housings 33. The bearings 57 of the lower press roller 30 are fixedly supported in the bearing housings 33, so as to maintain the upper surface of the press roller 30 at substantially the elevation of the upper surface of the table 21, while the bearings 56 of the upper press roller 29 are vertically adjustable by means of studs 58 pressing the bearings 56 downwardly against the resistance of springs 59 mounted between each pair of bearings 56 and 57. The clearance between the press rollers 29 and 30 may thus be easily adjusted to a definite maximum by suitably adjusting the studs 58 and locking them with lock nuts 60. The upper press roller 29 is driven from the lower press roller 30 by means of cooperating pairs of gears 61, which have teeth of sufficient depth to allow for meshing over the moderate range of clearance between the press rollers that is required to adjust for differences in grid thickness.

To receive and guide the grids 20 as they leave the press rollers 29 and 30, guide plates 62 and 63, shown in Figures 12 and 13, are secured to a transverse support bar 64 which in turn is secured to the bearing housing 33. The lower guide plate 62 is suspended from the support bar 64 by brackets 65 to which the plate may be secured by screws 66, and the brackets may be secured to the support bar by bolts 67, the brackets being spaced apart and adjacent to the ends of the support bar to permit passage of a grid between them. The upper guide plates 63 are preferably dual and spaced apart as shown in plan in Figure 2, being of sufficient width to guide the lateral margins of grids of various dimensions and yet not completely covering the transient grid but affording accessibility thereto. The lower guide plate 62 is disposed at an elevation such that its upper surface is in the plane of the upper surface of the table 21, the adjacent margins of the plate 62 and of the table being spaced to permit the lower press roll 30 to extend therebetween to the same level. The upper guide plates 63 are suspended from the support bar 64 by brackets 68 vertically adjustable in keyways 69 and secured therein by bolts 70. The guide plates 63 may, therefore, like the upper press roller 29 to which they are substantially contiguous, be adjusted to accommodate grids of various thicknesses.

Figure 4:
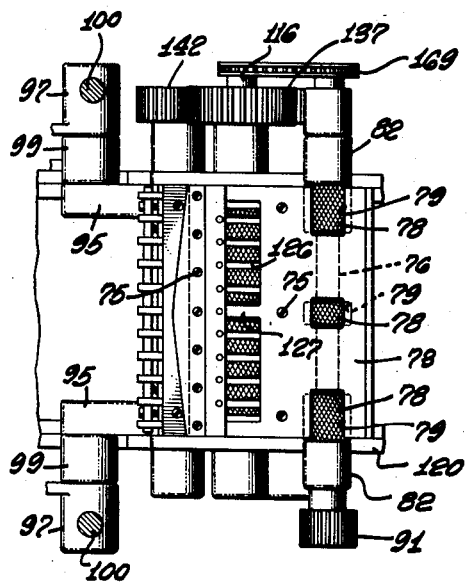
Figure 4 is a horizontal sectional view, looking upwardly at the paste-impressing mechanism, the plane of section being indicated by the line 4—4 of Figure 3.
Figure 5:
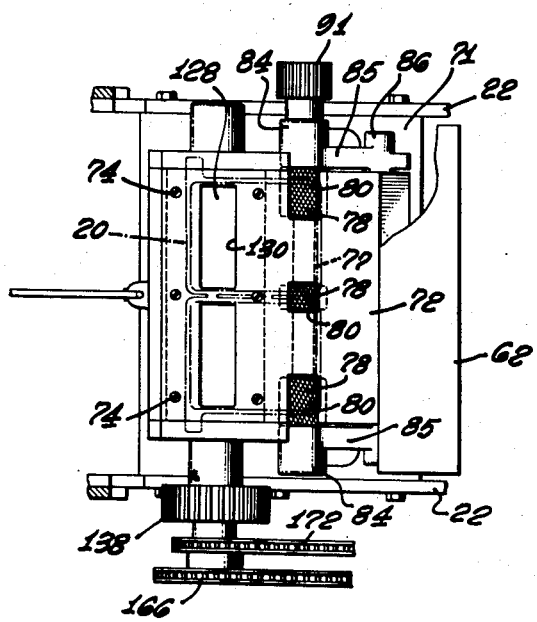
Figure 5 is a horizontal sectional view, looking downward from approximately the plane of Figure 4, the plane of section being more precisely indicated by the line 5—5 of Figure 3.

The press rollers 29 and 30 also act as conveyor rollers to receive the grids 20 as fed thereto by the push-bar 31 and to advance the grids towards the pasting mechanism below the hopper 23. In continuation of the linear path formed by the press rollers and by the guide plates 62 and 63, plates 72 and 73 are secured respectively to a housing block 71 mounted between side members of the frame 22, and to the lower margin of the hopper 23, as by screws 74 and 75. The lower plate 72, as shown in Figure 5, extends into substantial contiguity with the lower guide plate 62 so as to form therewith a continuous support for a grid. The upper plate 73, illustrated in Figure 4, may be spaced from the upper guide plate 63 to leave a gap through which the progress of the grids may be observed. To convey the grids between the plates 72 and 73, upper and lower conveyor rollers 76 and 77 are provided, having knurled ridges 78 extending through slots 79 and 80 in the plates 73 and 72, respectively, so as to be substantially flush with the adjacently opposed surfaces of the plates and to grip each successive grid and move it onward. The ridges 78 are spaced to grip the lateral margins and central bar 26 of each grid, these being the portions least susceptible to crushing.

The upper conveyor roller 76 (see Figure 8) is journalled in journal boxes 82 secured by bolts 83 to a hereinafter described removable portion of the hopper 23. The lower conveyor roller 77 is journalled in journal boxes 84 mounted in pivot arms 85 which are pivoted on pivot pins 86 held in brackets 87 secured to the housing block 71. Springs 88, held in sockets 89 formed in the brackets 87, urge the pivot arms 85, and consequently the lower conveyor roller 77, upwardly, and are adjustable in tension by set screws 90 (Figure 1). Cooperating gears 91 which, like the gears 61, have teeth of depth sufficient to mesh over a moderate range of radial relative movement, drive the lower conveyor roller 77 from the upper roller 76.

The hopper 23 is pivotally mounted so as to be tiltable to the position shown in broken lines at 23a in Figure 1, movement of the hopper to its upright position being assisted by a pneumatic cylinder 93 controlled through an air hose 94. One side of the hopper 23 is supported by bearing lugs 95 upon a fixed shaft 96, as illustrated in detail in Figure 14. The shaft 96 is held in brackets 97 by set screws 98, the brackets being spaced from the bearing lugs 95 by collars 99. The brackets 97 are provided with shafts 100 slidably held in the upper portion of a double collar 101 secured to the frame 22 and are adjustable vertically by nuts 102 on threaded extensions 103 of the shafts 100 engaging the lower portion of the double collar 101. The opposite side of the hopper 23 is also normally supported and may be secured in normal upright position by an arm 104 resting upon the transverse support bar 64. A stud bolt 105 in the support bar 64 has a threaded end extending upwardly thereabove so as to be able to pass through an opening 106 in the arm 104 and be engaged by a knurled nut 107 to lock the hopper 23 in normal upright position. Set screws 108 in the arm 104 bear upon the support bar 64 and by coordination of their adjustment with the adjustment of the shafts 100, the hopper may be adjusted vertically and yet maintained so that the plate 73 which is attached to it is parallel to the plate 72 attached to the housing block 71.

Such paralellism, as will be seen, is important to the proper operation of the machine, and so, also, is the adjustability of the spacing of the plates in precise and close relation to the rolled thickness of the grids and as a continuation of the path formed by the press rollers 29 and 30, the guide plates 62 and 63, and the conveyor rollers 76 and 77. It will be apparent that as both the upper conveyor roller 76 and the upper plate 73 are secured to the hopper 23, their relationship to each other is fixed, and adjustment of the hopper adjusts them both as path-defining members. The lower conveyor roller 77, being spring-biased, will adjust itself to the path of the grids.

As a control to the degree to which the hopper 23 may be tilted, a cross bar 110 is mounted between lugs 111 extending forwardly from the brackets 97, and a pawl 112 having a notch 113 is pivotally secured to one side of the hopper (Figures 1 and 2). When the hopper is in normal upright position, the end of the pawl 112 rests slidably upon the cross bar 110. When the hopper is tilted forwardly, the notch 113 engages the cross bar 110, limiting the tilt of the hopper to a degree at which it is not burdensomely overbalanced forwardly.

Figure 10:
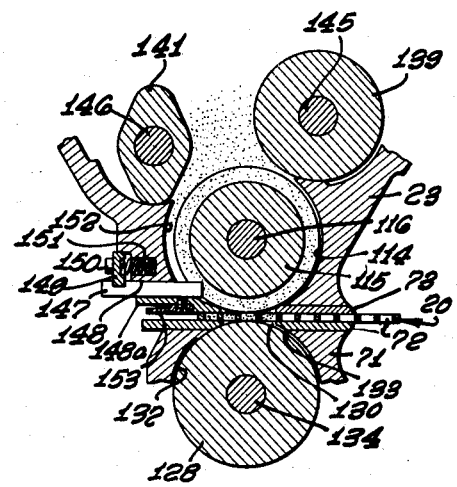
Figure 10 is a vertical sectional view through the aforesaid pasting rollers, taken at a right angle to the view of Figure 9, the plane of section being indicated by the line 10—10 of Figure 4.
Figure 11:
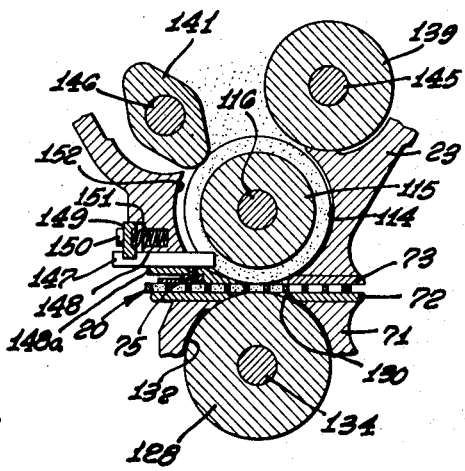
Figure 11 is a view similar to Figure 10, with parts shown advanced in operation.

As shown generally in Figure 3, and in greater detail in Figures 10 and 11, the lower portion of the hopper 23 has a transverse discharge throat 114 of substantially semi-cylindrical form in which is mounted a pasting roller 115. The pasting roller 115 is mounted slidably upon a shaft 116 held in bearings 117 and 117a in the side members of the hopper 23 and has at one end a keyway 118 in which to receive a key 119 held transversely of the shaft 116, so that the pasting roller may be slid on and off the shaft and secured rotatively with the shaft by engagement with the key. To permit sliding the pasting roller 115 upon the shaft 116, one side member 120 of the hopper 23 is secured to the hopper by bolts 121 (see Figure 2) and when removed from the hopper it carries with it its respective bearing 117, permitting removal of the pasting roller and leaving the shaft 116 held in the opposite bearing 117a. When in assembled position, the pasting roller is restrained from end play by the side member 120, thereby being held in engagement with the key 119.

The pasting roller 115 has a plurality of axially-spaced circumferential grooves 124 separated by knurled lands 125, and the upper plate 73 has a pair of transverse slots 126 into which the lands 125 extend, one of the grooves 124 being centrally disposed on the roller 115 to receive a bridge 127 between the slots 126, this bridge overlying the central bars 26 of grids in transit beneath the plate 73. The knurled lands 125 and grooves 124 are for the purpose of transporting paste from the hopper 23 to be applied through the slots 126 to the grids 20. A smooth surfaced roller 128 positioned directly below the roller 115 has a pair of wide circumferential lands 129 which extend upwardly into slots 130 in the lower plate 72 to apply paste forced through the grids 20 to the under sides thereof. The rollers 115 and 128 are so relatively spaced that the lands 125 and 129 come into close proximity with, but do not press upon the grids 20 moving between the plates 72 and 73.

The roller 128 is enclosed in a chamber 132 in the housing block 71 which closely encircles the roller except at an opening 133 aligned with the slots 130. After a period of operation paste will fill the chamber 132 but can not escape therefrom. The roller 128 is keyed to a shaft 134, in the same manner as the roller 115 is keyed to the shaft 116, and the shaft 134 has one end journalled in a bearing 135 in a journal box 136 removably secured to the housing block 71, and its other end journalled in a bearing 135a fixed in the housing block 71 so that by removal of the journal box 136, the roller 128 may be removed from the shaft 134, and the roller and the chamber 132 may be cleaned of paste, the shaft 134 then remaining in place in the bearing 135a. The shafts 116 and 134 are operatively connected by gears 137 and 138 mounted on the portions of the shafts extending outwardly from the fixed bearings 117a and 135a. The gears 137 and 138, like the gears 91 of the conveyor rollers, have teeth of sufficient depth to mesh over a moderate range of radial relative movement. Both the gears 91 and the gears 137 and 138 are in mesh only when the hopper 23 is in its normal upright operating position.

To feed paste from the hopper 23 to the pasting roller 115, as shown in Figures 10 and 11, a feed roller 139, preferably knurled, is mounted in the hopper 23 parallel to and closely approaching the roller 115 and driven in opposite rotative direction by a gear 140 meshing with the gear 137.

To agitate the paste in the hopper 23 and to feed the paste between the rollers 115 and 139, a paddle 141 is mounted transversely of the hopper adjacent to the roller 115 and is driven by a gear 142 in mesh with the gear 137. The paddle 141 also agitates a plate 143 secured by hinges 144 to a wall of the hopper 23 and forming a false interior wall thereof, so as to work paste constantly towards the passage between the rollers 115 and 139 where the paste will be forced into the grooves 124 and into the knurled surfaces of the lands 125. The roller 139 and paddle 141 are mounted in the same manner as the roller 115, being keyed to shafts 145 and 146, respectively, each of which has one end journalled in bearings in the removable side member 120 of the hopper 23 and the other end journalled in bearings in the opposite side member of the hopper.

To insure that paste in the grooves 124 is dislodged therefrom onto the grids and does not thereby continue to rotate with the pasting roller 115, a plurality of fingers 147 are mounted in the end wall of the hopper 23, extending through individual slots 148 therethrough into the throat 114 and thence into the grooves 124. A plate 148a, secured to the base of the hopper 23, retains the fingers 147 in the slot 148. The fingers 147 are preferably secured, as by welding, to a transverse bar 149, which may be adjusted by bolts 150 against the compression of springs 151 to bring the fingers 147 into deeper or shallower entry into the grooves 124. The throat 114 is not truly cylindrical or concentric with the pasting roller 115 but is offset therefrom to leave a space 152 on that side of the roller which rotates upwardly away from the grids. The fingers 147 tend to clear the paste from the grooves 124 and partly to block the space 152, placing a pressure upon the paste in the slots 126 to cause better infiltration of the paste into the grids but nevertheless permitting excess paste to escape upwardly between the fingers into the hopper. By reason of the hitherto-described vertical adjustability of the hopper 23 and the attached upper plate 73, the passage between the plates 73 and 72 may be, and preferably is, restricted to a height just permitting movement therethrough of a grid with no excess of paste on its upper and lower surfaces; but to allow a minimum clearance and to prevent escape of any excess paste, the upper plate 73 is provided with a marginal wiper blade 153 which may be a thin strip of resilient material in extension of the lower surface of the plate 73 and biased to bear against the upper surface of a grid. Both the downward pressure of the paste applied by the pasting roller 115 and the pressure of the blade 153 will tend to force a grid against the lower plate 72 and prevent escape of excess paste on the lower surface of a grid.

As the grids 20 emerge from between the plates 72 and 73, their lugs 27 are engaged by conveyor chains 155 which thereby support the leading edges of each successive grid. The chains 155 are spaced apart so as not to engage or support the body of a grid between the lugs 27, and consequently the trailing edge of each grid tends to fall between the chains 155. A downwardly inclined ramp or bar 156 is disposed beyond and below the lower plate 72 to support the trailing edge of each grid as it leaves the plate 72. The trailing edges of the grids are thus lowered gradually until the grids are vertically suspended from the chains 155 by their lugs 27 and swinging contact between adjacent grids is avoided. The conveyor chains 155 may convey the grids to an unloading point or to a firing chamber, as may be desired.

The machine is so designed that all parts, including the conveyor chains 155, may be driven by a single motor 160. The motor 160 is provided with a double chain sprocket 161, from one sprocket of which the conveyor chains 155 are driven by power chains 162 and 163 acting on speed-reducing double sprockets 164 and 165. From the other sprocket of the double sprocket 161, a power chain 166 drives a sprocket 167 on the end of the shaft 134 of the roller 128. The shaft 134 drives the shaft 116 of the pasting roller 115 through the gears 138 and 137, the direction of rotation of adjacent surfaces of the rollers 115 and 128 being in the direction of movement of a grid passing between the rollers. The gear 137 also drives the feed roller 139 and the paddle 141 by meshing with the gears 140 and 142. A sprocket 168 on the shaft 116 is connected by a chain 169 to a sprocket 170 on the upper conveyor roller 76. It will be recalled that the roller 76 drives the lower conveyor roller 77 through the gears 91, and it will be seen that the conveyor rollers and the rollers mounted in the hopper 23 for feeding and applying paste are all immobilized when the hopper is tilted so as to unmesh the gears 137 and 138. The press rollers 29 and 30 may, however, continue to be run, as would be desirable in adjusting them to press grids to micrometric tolerances, without having to convey the grids through the pasting mechanism. A second sprocket 171 on the shaft 134 is connected by a chain 172 to a sprocket 173 on the shaft 54 of the lower press roller 30. The shaft 54 drives the upper press roller 29 through the gears 61 and causes reciprocation of the push-bar 31 by means of the crank wheels 53 and pitmans 51.

In the operation of the machine, the press roller 29 is vertically adjusted by the studs 58 to roll the soft lead grids 20 to very exact thicknesses and smoothness, which may be within tolerances of the magnitude of one or two thousandths of an inch. The upper guide plates 63 are likewise vertically adjusted by means of the brackets 68 and bolts 70 to afford a pathway between the plates 63 and the lower guide plate 62 through which the precision-rolled grids may just pass freely. The hopper 23 is adjusted vertically by the nuts 102 and the set screws 108 so that the plate 73 is parallel with the plate 72 and spaced therefrom in approximately the same relation as the plates 63 and 62. In these conditions, the upper conveyor roller 76 will bear upon the upper surface of a grid and the lower conveyor roller 77 will yield, because of the spring 88, to permit the grid to pass between the rollers.

The pasting roller 115 and its opposite lower roller 128 will approximately touch the upper and lower surfaces of a grid, but without pressure, and the clearance between the plates 72 and 73 beyond the rollers 115 and 128 will permit only a micrometric layer of paste to remain upon the grid surface. This clearance is reduced by the resilient wiper blade 153 which causes the surface coatings of paste to be pressed firmly into the interstices of the grids.

Reciprocation of the push-bar 31 causes the lowest grid in a stack of grids to be pushed under the retaining plate 32 and into the press rollers 29 and 30 which press and smooth the grid and pass it onwardly to a position between the press rollers and the conveyor rollers where it will pause momentarily. A second cycle of reciprocation of the push-bar will move the next grid from the bottom of the stack into the press rollers and this second grid will then push the first grid into the grip of the conveyor rollers 76 and 77. The sprocket ratio on the driving mechanisms of the conveyor rollers and the press rollers is such that the conveyor rollers have a slightly greater peripheral speed than the press rollers and consequently advance the first grid out of contact with the second grid and move it between the rollers 115 and 128.

These last-mentioned rollers have considerably greater peripheral speed than the conveyor rollers, but as they do not press upon the grid, they do not advance the grid but instead they force paste into the interstices of the grid with a wiping action. It will be recalled that the paste is under some pressure, due to being forced from the grooves 124 by the fingers 147, and this pressure and the wiping action of the rollers are supplementary in forcing the paste into the grids. Even after the first grid has been advanced by the conveyor rollers so as to be clear thereof, it is not conveyed further by the rollers 115 and 128, but remains momentarily between them until the second grid again overtakes it and pushes it onward. This second push by the following grid advances the first grid to a position in which its lugs 27 engage the conveyor chains 155 and it is then moved onward out of contact with the following grid. As the peripheral speed of the rollers 115 and 128 always exceeds the speed at which a grid is advanced between them, they wipe paste into and upon a grid, throughout the length of the grid, and as there is no spacing between a preceding grid and the following pushing grid within the pasting mechanism, there is no opportunity while the procession of grids continues for the space between the plates 72 and 73 to become clogged by plaste. In this manner, a succession of grids are fed from a stack on the table 21 through the pressing and pasting mechanisms to the outgoing conveyor system and are rolled to precision thickness and evenly coated and filled with paste without wastage.

Figure 15:
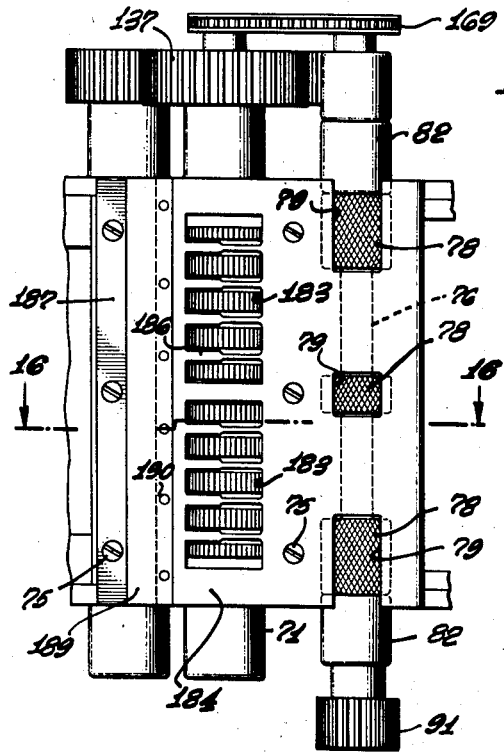
Figure 15 is a horizontal sectional view from below of a modified form of pasting roller, the viewpoint being similar to Figure 4, but the figure being on the scale of Figures 6 to 14.
Figure 16:
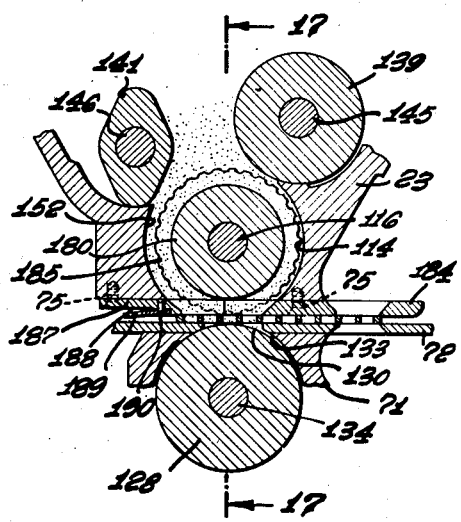
Figure 16 is a vertical sectional view of the modification shown in Figure 15, the plane of section being indicated by the line 16—16 of Figure 15.
Figure 17:
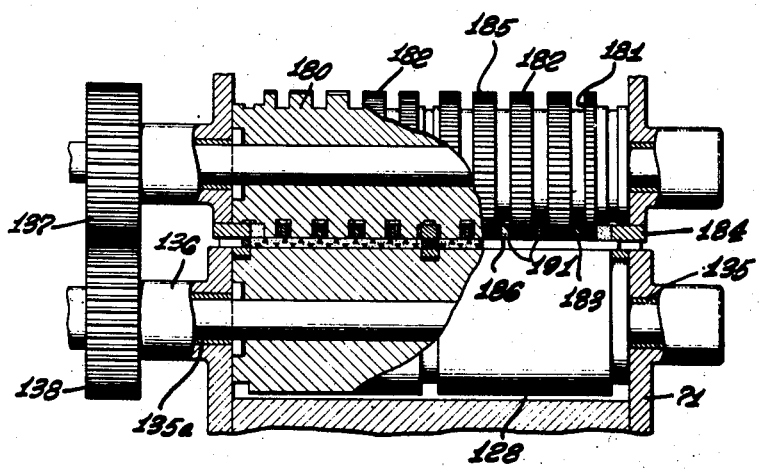
Figure 17 is a vertical sectional view taken at a right angle to, and on the line 17—17 of Figure 16.

In Figures 15 to 17, I have illustrated a modified form of pasting mechanism. A pasting roller 180 is mounted in the hopper 23 in the same manner as the pasting roller 115, previously described, and has a plurality of axially spaced circumferential grooves 181 separated by lands 182 which extend into individual slots 183 in a modified upper plate 184. The hopper 23 is substantially the same as heretofore described except that no provision is made for mounting fingers 147 which are omitted from this modification, and it contains a feed roller 139 and paddle 141 and supports an upper conveyor roller 76 and provides a space 152 adjacent the upwardly moving side of the roller 180. Likewise, a lower roller 128 is mounted in a chamber 132 in the housing block 71 and extends upwardly into slots 130 in a lower plate 72.

The lands 182 of the roller 180 are preferably not knurled, but are provided with transverse grooves 185, relatively shallow as compared with the circumferential grooves 181 but sufficiently deep to contain a quantity of paste fed thereto by the feed roller 139 and to permit a flow of paste from one circumferential groove to another so as to equalize pressure across the face of the roller. As may be seen in Figure 15, the individual slots 183 which receive the lands 182 are wider at their ends which the lands rotatively enter than at their opposite ends from which the lands rotatively depart, and the intervening bridges 186 are consequently narrower and then wider in the direction of movement of the roller and of a grid moving past the roller, the change in width occurring at the middle points of the slots 183 where the lands 182 most deeply enter the slots. The plate 184 preferably has a thin marginal portion 187 forming a recess 188 in which a resilient wiper blade 189 is held by screws 190.

In this modified form of pasting mechanism, the grooves 181 and 185 carry paste from the hopper 23 to the slots 183, there to apply it to a grid moving or temporarily halted between the plates 184 and 72. The narrow portions of the bridges 186 first enter the grooves 181, forcing the paste therein outwardly on both sides of the bridges and into the grooves 185 and onto the faces of the lands 182 and the lower surfaces of the bridges. These faces and surfaces either approach or are in approximate contact with the transient grid and so force the paste into the grid interstices. As a given point in a groove 181 approaches the grid, the forcing action upon the paste in the groove is intensified by deeper penetration of the bridge into the groove and at the instant of closest approach, the action is further intensified by the widening of the bridge. The quantity of paste thus forced from the grooves 181 constitutes an excess over the quantity which a grid may receive in its interstices and carry away between the plates 184 and 72, and the excess paste seeks outlets through the network of grooves 181 and 185. The bridges 186 do not completely fill the grooves 181 but leave open passages at the bottoms of the grooves, as indicated at 191 in Figure 17, through which excess paste may escape to the ascending side of the roller 180 and the space 152, but in the process of escape the pressure is substantially equalized across the face of the roller and a very efficient and uniform filling and smearing of the grid is effected.

Either of the above-described pasting mechanisms is adapted to precise adjustment for a desired thickness of grid, as in each instance the upper pasting roller 115 or 180, the upper plate 73 or 184, and the upper conveyor roller 76 are in fixed relationship to each other at substantially uniform distance from the lower plate 72. The hopper may therefore be adjusted to obtain a precise desired spacing of the upper and lower plates which may be conveniently measured by micrometric guages at the entering and discharge ends of the passage formed by the plates; and the press roller 29 may then be adjusted to press a grid to a thickness which will just pass through such a passage, the upper guide plate 63 being likewise adjusted. As a matter of operational convenience, it is usually more efficient to adjust the upper guide plate 63 to a desired clearance above the lower guide plate 62, as such clearance may also be conveniently measured; then to adjust the press roller 29 to roll a grid to a thickness just passable between the plates 62 and 63, these adjustments being made with the hopper tilted and the pasting mechanism immobilized; and then to adjust the hopper to permit a precisely rolled grid just to pass through the pasting mechanism.

All parts of the machine which are apt to become smeared with paste are easily accessible for cleaning. By removing the side member 120 of the hopper 23, the pasting rollers 115 or 180, the feed roller 139, paddle 141, and upper conveyor roller 76 may be removed, the hopper itself being then readily accessible. By removing one of the pivot arms 85, the lower conveyor roller 77 may be removed, and by removing the journal box 136, the lower roller 128 may be removed from the chamber 132. These operations may be performed without disturbing the system of driving chains and sprockets mounted on the other side of the machine. By tilting the hopper 23, the plates 73 or 184, and 72 become accessible on their adjacent surfaces, and they may be removed to further open the throat 114 and chamber 132 by the removal of screws 74 and 75.

I claim:

1. In a grid pasting machine having a frame, a hopper for supplying paste mounted on said frame so as to leave a passage therebetween, said hopper having a discharge throat open to said passage, and means for conveying grids through said passage, pasting mechanism comprising a roller mounted in said throat for conveying paste from said hopper to said grids, and having circumferential grooves and lands and having relatively shallow transverse grooves on said lands communicating between said circumferential grooves, and a member forming a partial closure to said throat and having a flat surface defining one side of a path for said grids, and having apertures individual to each of said lands into which said lands extend so as to be substantially tangent to the path-defining surface of said member, and bridges separating said apertures extending into said circumferential grooves and having narrow portions underlying the approaching portion of said roller and wider portions underlying the departing portion of said roller so as to force increasing quantities of paste from said circumferential grooves to said lands and said transverse grooves for distribution upon a grid.

2. In a grid pasting machine, means for supporting grids during movement thereof through said machine, a hopper for paste to be applied to grids moving therepast, means for adjusting said hopper in spaced relation to said grid-supporting means, a revolubly mounted pasting roller carried by said hopper having circumferential grooves and lands, means for rotating said roller, means for moving grids successively past said pasting roller to receive paste therefrom, means mounted upon said hopper for defining a path for said grids and having aperture means into which said pasting roller extends, and means for forcing paste from said pasting roller's grooves onto a grid comprising a plurality of fingers slidably mounted on said hopper, each of said fingers extending into one of said pasting roller's circumferential grooves, and means for adjusting said fingers to vary the depth of penetration thereof into said grooves.

3. In a grid pasting machine, means for supporting grids during movement thereof through said machine, a hopper for paste to be applied to grids moving therepast, means for adjusting said hopper in spaced relation to said grid-supporting means, a revolubly mounted pasting roller carried by said hopper having circumferential grooves and lands, means for rotating said roller, means for moving grids successively past said pasting roller to receive paste therefrom, means mounted upon said hopper for defining a path for said grids and having aperture means into which said pasting roller extends, said aperture means being individual to said lands with a portion of each of said lands extending into the associated one of said apertures, and means for forcing paste from said pasting roller's grooves onto a grid comprising a bridge interposed between each two adjacent ones of said aperture means and thereby being disposed within one of said pasting roller's circumferential grooves, said bridges having narrow portions proximal to the portion of said pasting roller approaching a grid and wider portions proximal to the portion of said pasting roller departing from said grid.

4. In a grid pasting machine, means for supporting grids during movement thereof through said machine, a hopper for paste to be applied to grids moving therepast, means for adjusting said hopper in spaced relation to said grid-supporting means, a revolubly mounted pasting roller carried by said hopper having circumferential grooves and lands, means for rotating said roller, means for moving grids successively past said pasting roller to receive paste therefrom, means mounted upon said hopper for defining a path for said grids and having aperture means into which said pasting roller extends, said aperture means being individual to said lands with a portion of each of said lands extending into the associated one of said apertures, and means for forcing paste from said pasting roller's grooves onto a grid comprising a bridge interposed between each two adjacent ones of said aperture means and thereby being disposed within one of said pasting roller's circumferential grooves, said bridges having narrow portions proximal to the portion of said pasting roller approaching a grid and wider portions proximal to the portion of said pasting roller departing from said grid, each of said bridges being so spaced from the bottom of its associated groove as to permit some paste to remain therebetween, and said lands having relatively shallow transverse grooves establishing communication between adjacent ones of said circumferential pressure for equalizing paste pressure at points axially spaced on said roller.

References Cited in the file of this patent

UNITED STATES PATENTS

| Number | Name | Date |
|---|---|---|
| 1,398,790 | Ogur | Nov. 29, 1921 |
| 1,518,226 | Shepherd | Dec. 9, 1924 |
| 1,651,678 | Davis | Dec. 6, 1927 |
| 1,757,546 | Price et al. | May 6, 1930 |
| 1,975,039 | Goodrich et al. | Sept. 25, 1934 |
| 2,212,070 | Luhrman | Aug. 20, 1940 |
| 2,382,367 | Donath | Aug. 14, 1945 |